United States Patent [19]

Chestnov

[11] 4,073,853

[45] Feb. 14, 1978

[54] METHOD OF FORMING A DESIGN AND AN ACCESSORY ARTICLE

[75] Inventor: Robert E. Chestnov, Wayne, N.J.

[73] Assignee: Jaclyn, Inc., West New York, N.J.

[21] Appl. No.: 645,798

[22] Filed: Dec. 31, 1975

[51] Int. Cl.2 .................................... B29C 3/00

[52] U.S. Cl. .................................... 264/132; 264/134; 264/266; 264/320; 264/135; 156/220; 428/203; 428/16; 428/156

[58] Field of Search ........................ 156/220, 221, 222; 428/156, 161, 203, 204, 16; 264/129, 132, 134, 135, 266, 293, 320

[56] References Cited

U.S. PATENT DOCUMENTS

| | | | |
|---|---|---|---|
| 256,476 | 4/1882 | Guilford | 264/266 X |
| 2,477,300 | 7/1949 | Karfiol et al. | 428/161 X |
| 3,049,459 | 8/1962 | Smith et al. | 428/203 |
| 3,057,017 | 10/1962 | Sucher | 264/132 |
| 3,655,312 | 4/1972 | Erb et al. | 156/220 X |
| 3,917,786 | 11/1975 | Weigert | 264/132 X |

*Primary Examiner*—Ralph S. Kendall
*Attorney, Agent, or Firm*—Sommers & Sommers

[57] ABSTRACT

A method of forming a three-dimensional colored design, such as a simulated animal bone, in production material which is to be formed into an article such as a handbag, including forming a master, forming a mold member, and applying a colored design to the production material. A light-transmitting film, which includes a colored design formed on one surface thereof, is positioned intermediate the production material and the mold member with the colored design facing the production material. The production material, the light-transmitting film, and the mold member are heated and pressed together in a high frequency heating press, and the production material and light-transmitting film are hardened, so as to form the three-dimensional colored design in an efficient, convenient and economical manner. The light-transmitting film substantially covers the three-dimensional colored design, with the colored design on the inside surface thereof, so as to protect the three-dimensional colored design and the colored design on the light-transmitting film from abrasion, and to provide a smooth finish and luster thereto. An accessory article, such as an ornamental pin or strap closure, includes a three-dimensional colored simulated animal bone design on the outer surface thereof, and a light-transmitting film, which substantially covers the three-dimensional colored design, which includes a colored design on the inside surface thereof, for protecting the three-dimensional colored design and the colored design on the light-transmitting film from abrasion, and for providing a smooth finish and luster thereto.

6 Claims, 6 Drawing Figures

METHOD OF FORMING A DESIGN AND AN ACCESSORY ARTICLE

BACKGROUND OF THE INVENTION

This invention relates generally to three-dimensional designs, and more particularly to a method of forming a three-dimensional colored design in production material and an accessory article including a three-dimensional colored design on the outer surface thereof.

A method, used heretofore, of forming a three-dimensional colored design in production material included forming impressions in the production material, applying each color in the design thereto at separate operator stations at which each operator spray-painted one color through a hand-held manually-aligned template, and cleaning extraneous paint from the surface of the design portion of the piece of production material at separate operator stations at which each operator manually applied cleaning compound thereto and wiped and dried such surfaces. This method was very inefficient, time consuming, and costly, and the three-dimensional colored design formed thereby was subject to abrasion and did not have a smooth finish and luster.

SUMMARY OF THE INVENTION

In view of the foregoing, an object of this invention is to form a three-dimensional colored design in production material in an efficient, convenient, and economical manner. Another object of this invention is to form such a three-dimensional colored design, and to provide an accessory article including a three-dimensional colored design on the outer surface thereof, which designs are protected against abrasion and are provided with a smooth finish and luster.

The foregoing objects and others are achieved in this invention by a method of forming a three-dimensional colored design, such as a simulated animal bone, in production material which is to be formed into an article, such as a handbag, including forming a master, forming a mold member, and applying a colored design to the production material. A light-transmitting film, which includes a colored design formed on one surface thereof, is positioned intermediate the production material and the mold member with the colored design facing the production material. The production material, the light-transmitting film, and the mold member are heated and pressed together in a high frequency heating press, and the production material and light-transmitting film are hardened, so as to form the three-dimensional colored design in an efficient, convenient and economical manner. The light-transmitting film substantially covers the three-dimensional colored design, with the colored design on the inside surface thereof, so as to protect the three-dimensional colored design and the colored design on the light-transmitting film from abrasion, and to provide a smooth finish and luster thereto. An accessory article, such as an ornamental pin or strap closure, includes a three-dimensional colored simulated animal bone design on the outer surface thereof, and a light-transmitting film, which substantially covers the three-dimensional colored design, which includes a colored design on the inside surface thereof, for protecting the three-dimensional colored design and the colored design on the light-transmitting film from abrasion, and for providing a smooth finish and luster thereto.

DESCRIPTION OF THE DRAWINGS

The invention is illustrated, by way of example, in the accompanying drawings, wherein.

DESCRIPTION OF THE PREFERRED EMBODIMENT

Figure 1:
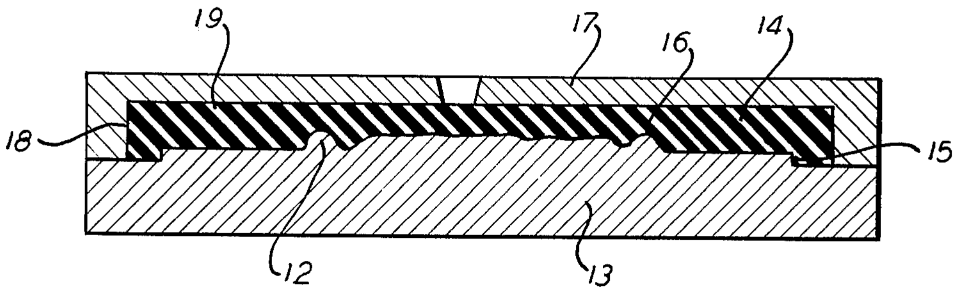
FIG. 1 is a side sectional elevational view of the step of forming a mold member in a chamber formed intermediate an enclosure cavity and a master, in accordance with the method of the invention.
Figure 2:
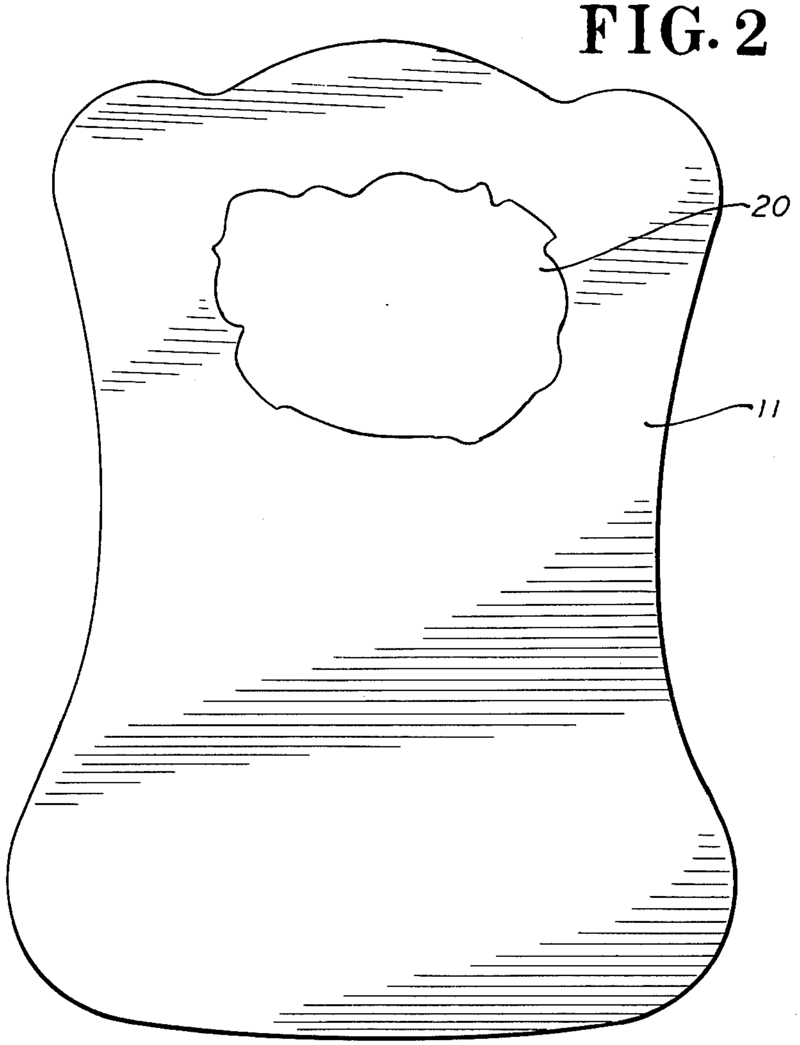
FIG. 2 is a front elevational view of a two-dimensional colored design applied to production material, in accordance with the method of the invention.
Figure 3:
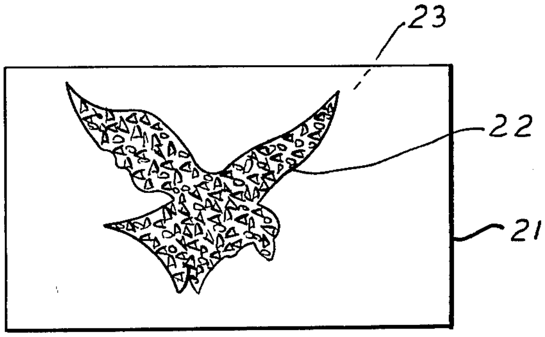
FIG. 3 is a front elevational view of a film of light-transmitting material with a two-dimensional colored design formed on one surface thereof, used in the method of the invention.
Figure 4:
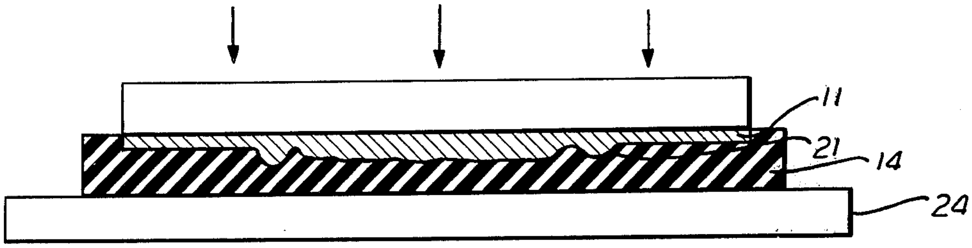
FIG. 4 is a side sectional view of the step of heating and pressing together the production material, the film of light-transmitting material, and the mold member, in accordance with the method of the invention.

In the preferred embodiment of the invention illustrated in FIGS. 1–4 and 6, for example, the method of forming a three-dimensional colored design 10, such as a simulated animal bone, in production material 11, such as vinyl, canvas or leather, which production material 11 is to be formed into an article such as a handbag, includes forming a three-dimensional design 12, such as the simulated animal bone, on master 13 such as leather. A mold member 14 is formed, so as to have a cavity 15 having a three-dimensional design portion 16 therein, by positioning an enclosure 17 having a cavity 18 therein over the master 13, such that the three-dimensional design 12 on the master 13 faces into the cavity 18 of the enclosure 17 so as to form a chamber 19 therebetween, filling the chamber 19 with liquified material such as silicone rubber or metal, and hardening the liquified material as by curing same in an oven. A two-dimensional colored design 20, in a pattern corresponding to the pattern of the three-dimensional design 12, such as a bone-colored design, is applied to the production material 11 as by silk screening or heat transfer printing thereof, at a location thereon corresponding to the location of the three-dimensional design cavity portion 16 of the cavity 15 of the mold member 14. The production material 11, and a film of light-transmitting material 21, such as clear plastic, which includes a two-dimensional colored design 22 formed on one surface 23 thereof, are positioned in the cavity 15 of the mold member 14, with the light-transmitting film 21 intermediate the production material 11 and the three-dimensional design cavity portion 16 of the mold member 14, and with the two-dimensional colored design 22 facing the two-dimensional colored design 20 of the production material 11. The two-dimensional colored design 22 may be formed on the light-transmitting film 21 by applying, as by silk screening, a plurality of colors, such as light-transmitting colors, on the surface 23 of the light-transmitting film 21. The production material 11, the light-transmitting film 21, and the mold member 14 are heated and pressed together in a high frequency heating press 24, such that the production material 11 flows to conform to the contours of the three-dimensional design cavity portion 16 of the mold member 14, and the production material 11 and light-transmitting film 21 are hardened so as to form the three-dimensional colored design in an efficient, convenient and economical manner. The light-transmitting film 21 substantially covers the three-dimensional colored design 10, with the two-dimensional colored design 22 on the inside surface 23 of the light-transmitting film 21, so as to protect the two-dimensional colored design 22 and the three-dimensional colored design 10 from abrasion, and to provide a smooth finish and luster thereto. A stain is applied to the three-dimensional colored design 10, as by air-brush spray-painting thereof, so as to provide an antiqued finish and natural appearance thereto.

Figure 5:
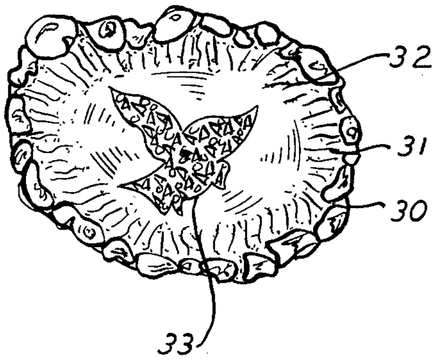
FIG. 5 is a front elevational view of an accessory article including a three-dimensional colored simulated bone accessory design on the outer surface thereof, pursuant to the invention.
Figure 6:
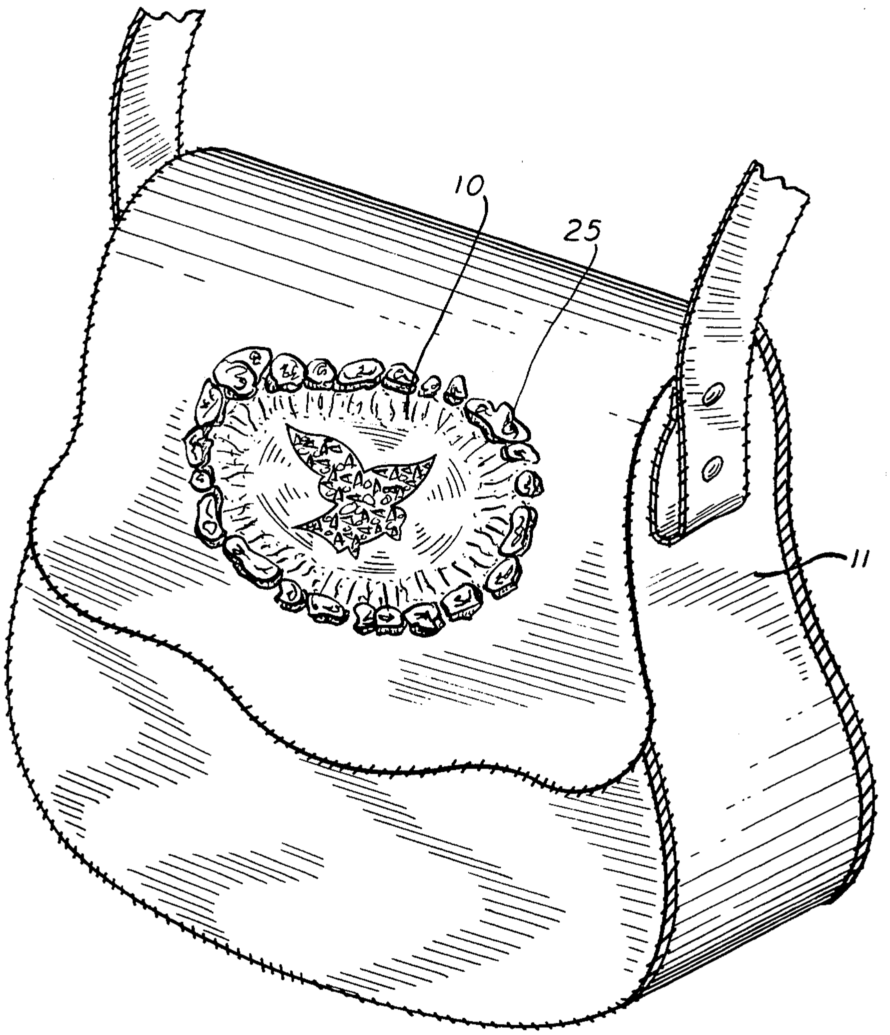
FIG. 6 is a partly-fragmentary perspective view of a handbag formed from the production material.

An accessory article 30, such as an ornamental pin or strap closure, illustrated in FIG. 5, for example, includes a three-dimensional colored simulated animal bone design 31 on the outer surface thereof, and a light-transmitting film 32, which may comprise clear plastic, which substantially covers the three-dimensional colored simulated animal bone design 31, and which includes a colored design 33 formed on the inside surface thereof, to protect the three-dimensional colored simulated animal bone design 31 and the colored design 33 against abrasion, and to provide a smooth finish and luster thereto. The colored design 33 may comprise a plurality of light-transmitting colors applied to the inside surface of the light-transmitting film 32. The three-dimensional colored simulated animal bone design 31 further includes stained portions which provide an antiqued finish and natural appearance thereto.

While the invention has been set forth above in terms of a specific embodiment thereof, it should be understood that variations may be made therein by those skilled in the art which are nevertheless within the scope and spirit of the invention. The invention, therefore, is to be broadly construed within the scope and spirit of the following claims.

I claim:

1. A method of forming a three-dimensional colored design in a piece of production material, comprising:

a. preparing a master, including forming a three-dimensional design on a piece of master material;

b. forming a mold having a cavity having a three-dimensional design portion therein from the prepared master, including positioning an enclosure having a cavity therein over the master such that the three-dimensional design on the master faces into the cavity in the enclosure, so as to form a chamber therebetween, filling the chamber with liquified mold-forming material, and hardening the liquified mold-forming material;

c. applying a two-dimensional colored design, in a two-dimensional pattern corresponding to the pattern of the three-dimensional design, to a portion of the piece of production material at a location thereon corresponding to the location of the three-dimensional design cavity portion of the mold;

d. forming a piece of light-transmitting material in the shape of the two-dimensional pattern of the three-dimensional colored design;

e. positioning the piece of production material and piece of light-transmitting material in the cavity of the mold so that the piece of light-transmitting material is disposed intermediate the two-dimensional colored design portion of the piece of production material and the three-dimensional design cavity portion of the mold; and f. heating and pressing together the piece of production material, the piece of light-transmitting material, and the mold in a high frequency heating press so that the production material flows to conform to the three-dimensional design cavities in the mold with the piece of light-transmitting material substantially covering the three-dimensional colored design portion of the piece of production material, and hardening the piece of production material and piece of light-transmitting material.

2. A method as in claim 1, further including forming a two-dimensional colored design in reverse image on one surface of the piece of light-transmitting material, and in which the step of positioning the piece of production material and piece of light-transmitting material in the cavity of the mold further includes disposing the one surface of the piece of light-transmitting material with the design formed thereon in reverse image so as to face the two-dimensional colored design portion of the piece of production material.

3. A method as in claim 1, in which the three-dimensional colored design formed in the piece of production material comprises a simulated animal bone.

4. A method as in claim 1, further comprising the step of applying stain to the piece of light-transmitting material which substantially covers the three-dimensional colored design in the piece of production material.

5. A method as in claim 2, in which the step of forming a two-dimensional colored design in reverse image on one surface of the piece of light-transmitting material comprises applying a plurality of colors thereto.

6. A method as in claim 5, in which the colors applied to the piece of light-transmitting material comprise light-transmitting colors.

* * * * *